United States Patent [19]

Hsie et al.

[11] Patent Number: 5,184,394
[45] Date of Patent: Feb. 9, 1993

[54] METHOD OF MAKING A THIN FILM HEAD ON FERRITE SUBSTRATE WITH INCLINED TOP POLE

[75] Inventors: Wei C. Hsie, Eden Prairie; Timothy A. Masaden, Bloomington; Nathan Curland, St. Louis Park, all of Minn.

[73] Assignee: Seagate Technology, Inc., Scotts Valley, Calif.

[21] Appl. No.: 891,946

[22] Filed: Jun. 1, 1992

Related U.S. Application Data

[60] Division of Ser. No. 734,058, Jul. 22, 1991, Pat. No. 5,130,877, which is a continuation of Ser. No. 514,746, Apr. 26, 1990, abandoned.

[51] Int. Cl.⁵ ................................................. G11B 5/42
[52] U.S. Cl. ...................................... 29/603; 360/126; 427/131; 427/132
[58] Field of Search ................. 29/603; 427/131, 132; 360/122, 125–127

[56] References Cited

U.S. PATENT DOCUMENTS

| | | | |
|---|---|---|---|
| 4,788,612 | 11/1988 | Perlov | 360/120 |
| 4,797,765 | 1/1989 | Ezaki et al. | 360/110 |
| 4,878,290 | 11/1989 | Masud et al. | 29/603 |

Primary Examiner—Carl E. Hall
Attorney, Agent, or Firm—Kinney & Lange

[57] ABSTRACT

A thin film magnetic read/write head deposited upon a magnetic substrate and including a shallow top pole take-off angle reduces leading and trailing undershoots in an isolated pulse signal. The undershoots are reduced by minimizing the magnetic discontinuities across the recording surface of the head, except for the recording gap.

11 Claims, 8 Drawing Sheets

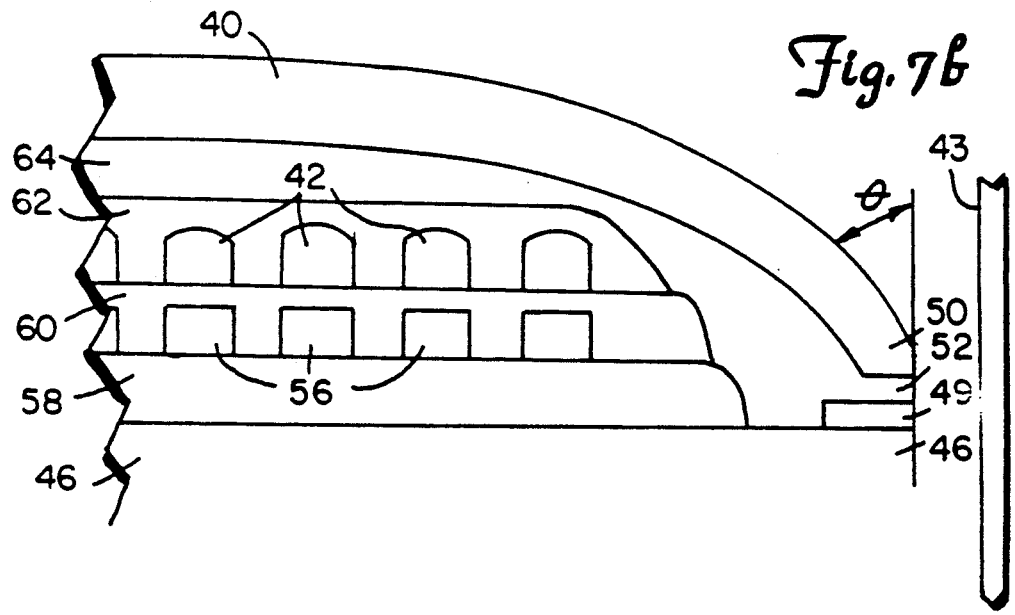
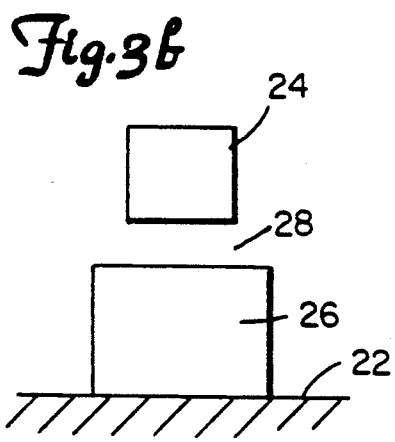
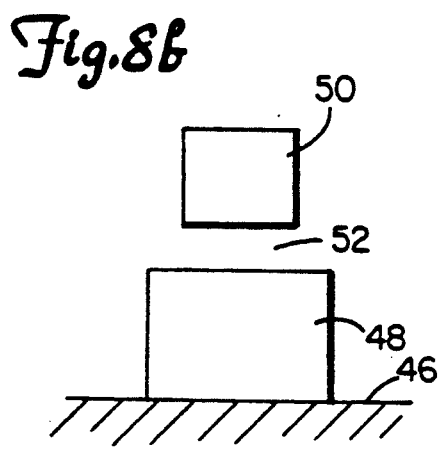
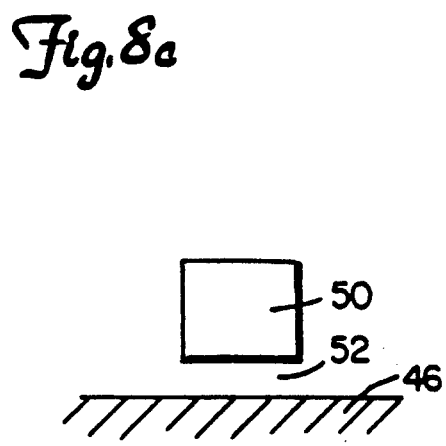

METHOD OF MAKING A THIN FILM HEAD ON FERRITE SUBSTRATE WITH INCLINED TOP POLE

This is a divisional of application Ser. No. 07/734,058, filed Jul. 22, 1991, now U.S. Pat. No. 5,130,877 which is a continuation of application Ser. No. 07/514,746 filed Apr. 26, 1990, now abandoned.

BACKGROUND OF THE INVENTION

The present invention relates to thin film magnetic recording heads. In particular, the invention relates to an improved thin film magnetic head design which reduces undershoot or inter-symbol interference.

In a magnetic storage system, such as a computer disk drive, digital information is magnetically stored upon the surface of a magnetic medium such as a magnetic storage disk. The digital information is represented by selectively polarizing the magnetic field of consecutive areas across the surface of the rotating magnetic disk. When this information is read back from the storage disk, the magnetic polarization of the medium is sensed as an electrical output signal. The read and write operations are performed by a magnetic read/write head which is flying over the surface of the rotating disk.

The electrical output signal is representative of both the relative strength of the magnetization in the media, and the magnetic field pattern of the read head. It is highly desirable to provide the highest level of information storage density possible for a given magnetic storage system. Unfortunately, increased storage density leads to a lower signal-to-noise ratio for the sensed signal from a given disk. The readback signal comprises a series of superimposed symbols whose existence and location are used to represent digital information.

Signal recovery errors will result if the detection circuitry is confused in one of the following three ways:

1) Detecting a symbol that was not written;
2) Rejecting a symbol that was written;
3) Placing a written symbol in the wrong clock cell.

Cost effective detectors presently in use are confused by leading and trailing undershoots in the isolated readback pulse just as easily as they are confused by noise.

Therefore, the undershoots reduce the maximum recording density which may be achieved in a magnetic storage system. Undershoot occurs due to the discontinuities in the magnetic readback flux path characteristic of the infinite pole lengths of the thin film recording head. Rather than trying to compensate for the undershoots in the data signal using sophisticated electronic decoding methods, it would be highly desirable and a significant contribution to the art to provide a thin film magnetic head which minimizes the leading and trailing undershoots in the isolated readback pulse.

SUMMARY OF THE INVENTION

The present invention provides an improved thin film magnetic head which minimizes leading and trailing undershoots in the isolated read back pulses. The present invention limits undershoots by minimizing the discontinuities in the magnetic flux path across the recording surface of the head, except for the recording gap.

In the present invention, the leading undershoot (or trailing, dependent on the direction of travel of the magnetic medium relative to the magnetic head) is virtually eliminated by depositing the thin film head on a magnetic substrate, such as ferrite. The magnetic substrate eliminates the abrupt magnetic discontinuity in the readback magnetic flux.

The trailing undershoot (or leading depending on the relative direction of travel between the magnetic head and the magnetic medium) is also reduced in the present invention. The trailing edge undershoot is reduced by a top pole piece generally extending away from the gap, and inclined from the plane of the recording surface. The top pole piece is sloped away from this plane at an angle from substantially greater than 0° to about 60°. This provides a much more shallow incline than in prior art designs. The shallow incline of the top pole relative to the recording surface reduces the magnetic discontinuity in the magnetic flux path of the thin film head and widens the spatial extent of the trailing undershoot of the isolated readback pulse.

The shallow incline is formed during the fabrication of the thin film head. During fabrication, a top pole piece and a bottom pole piece are deposited to form the thin film head. Layers of insulation (which typically comprise photoresist) are used to separate the pole pieces and the electrical conductors used during reading and writing operations. The insulation layers are applied so that the desired take-off angle is formed. The top pole piece is then deposited upon the insulation layers and generally conforms to the shape defined by the insulation layers.

BRIEF DESCRIPTION OF THE DRAWINGS

FIG. 3b shows the view of an air bearing surface corresponding to FIG. 3(a).

FIG. 7b is a cross sectional view of a thin film magnetic head made in accordance with the present invention including a lower pole tip.

FIG. 8b shows the view of an air bearing surface corresponding to FIG. 8a.

FIG. 8c shows the view of an air bearing surface using a magnetic substrate as a bottom pole.

DETAILED DESCRIPTION OF THE PREFERRED EMBODIMENTS

Figure 1:
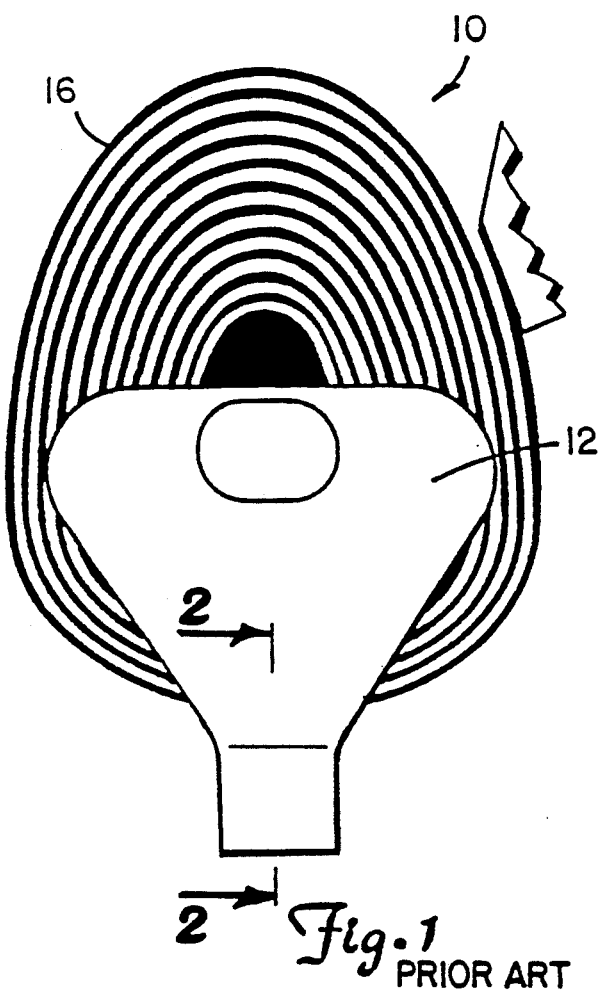
FIG. 1 shows a top plan view of a prior art thin film magnetic head.
Figure 2:
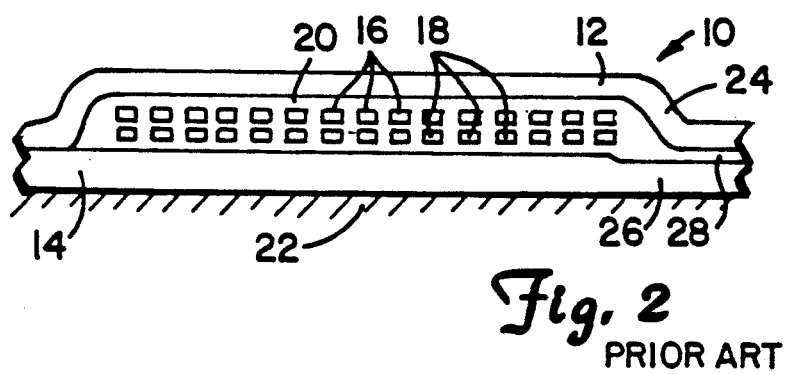
FIG. 2 is a cross sectional view of the prior art thin film head of FIG. taken along the line labeled 2—2.

A prior art multi-turn inductive thin film magnetic head 10 is shown schematically in FIGS. 1 and 2. FIG. 1 is a top view of prior art thin film head 10 and FIG. 2 is a side cross sectional view. Prior art thin film head 10 includes top and bottom magnetic thin film core legs 12 and 14 which comprise a nickel iron alloy. Photolithography is used to define the geometry of both top and bottom magnetic core legs 12 and 14. Conductive coils 16 and 18 extend between top and bottom magnetic thin film core legs 12 and 14 and are electrically insulated from top and bottom magnetic core legs 12 and 14 by an insulating layer 20. Prior art thin film head 10 is deposited upon a nonmagnetic substrate 22 comprising a ceramic compound such as $Al_2O_3$-TiC.

In fabricating prior art thin film head 10, several separate pattern transfer processes are used to deposit head 10 upon substrate 22. These transfer processes include chemical etching, plating and sputtering. A typical head fabrication process may account for more than a dozen masking levels and more than thirty processing steps.

During fabrication, heads similar to prior art thin film head 10 are deposited across the entire surface of substrate 22. After the layers of head 10 are deposited as depicted in FIGS. 1 and 2, substrate 22 is "diced" or sliced into many individual thin film heads, each carried by a portion of substrate 22 so that an upper pole tip 24, a lower pole tip 26 and a gap 28 are exposed. Pole tips 24 and 26 and gap 28 (and the portion of substrate 22 which underlies them) are then lapped in a direction generally inward, toward the center of thin film head 10, to achieve the desired dimensions. This lapping process is a mechanical process in which the exposed portion of top and bottom pole tips 24 and 26 and gap 28 are applied to an abrasive, such as a diamond slurry. Electrical contacts (not shown) are connected to conductors 16 and 18. The completed head is next attached to a spring (not shown) for use in reading and writing data on a magnetic storage medium such as a computer disk.

In operation, the thin film head flies above the disk with its pole tips 24 and 26. During a read operation, magnetic flux passes through the top and bottom magnetic film cores 12 and 14 around conductors 16 and 18. The magnetic field induces an electrical voltage across the coil conductors 16 and 18 which is detected by a high impedance differential amplifier. The voltage is proportional to the rate of change of magnetic flux linking the head coil emanating from the moving magnetic storage medium. During a write operation, an electrical current is caused to flow in conductor 16 or conductor 18. This electric current induces a magnetization in the top and bottom magnetic film cores 12 and 14 and causes a magnetic field to cross gap 28 between upper and lower pole tips 24 and 26. The construction of upper and lower pole tips 24 and 26 and gap 28 causes a fringe field to extend beyond the boundary of pole tips 24 and 26 and into the magnetic storage medium. This fringe field may be used to magnetize patterns in the storage medium and write information.

Figure 3A:
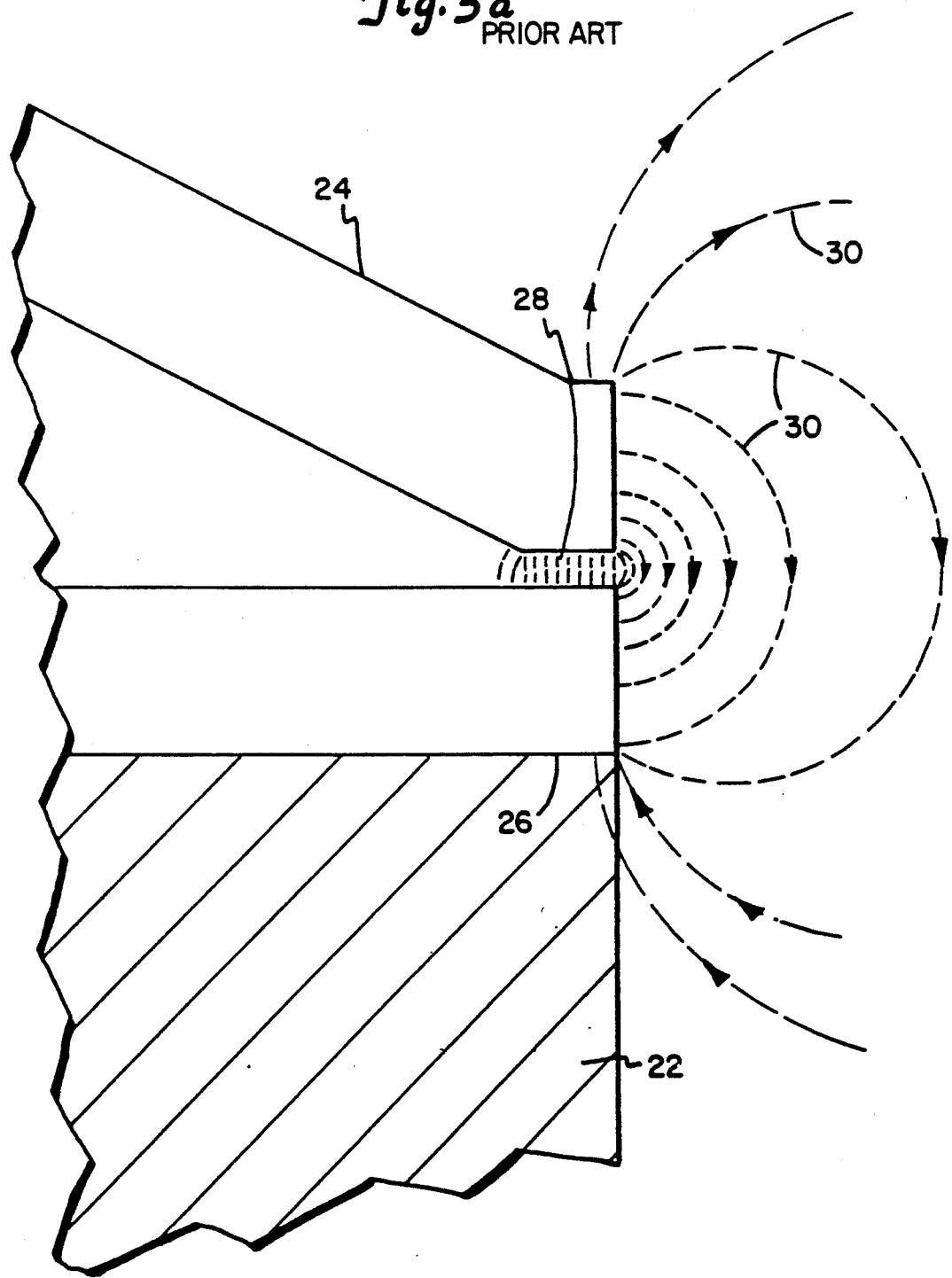
FIG. 3a shows a magnetic flux diagram for the prior art thin film magnetic head of FIG. 1.
Figure 4:
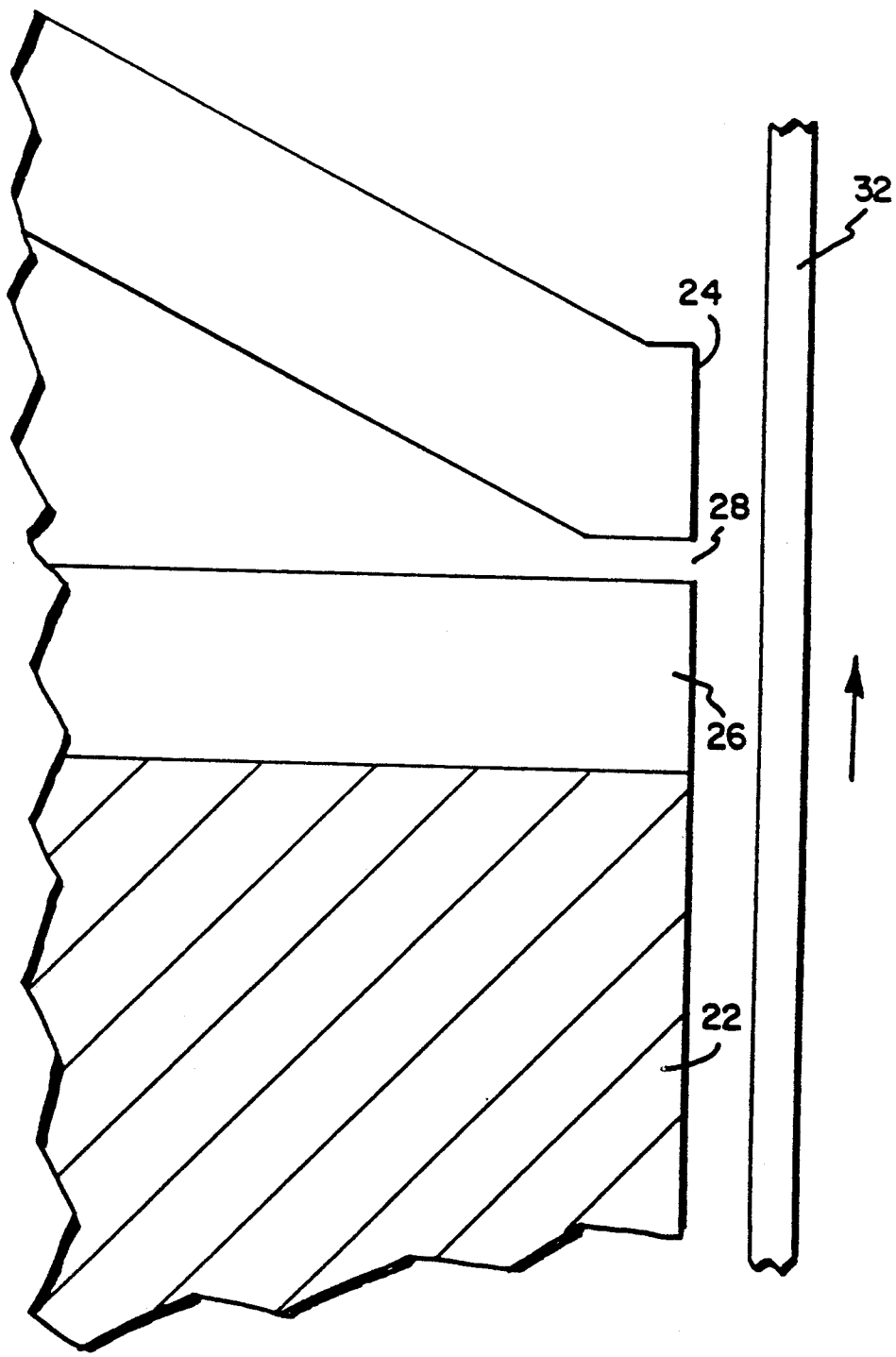
FIG. 4 shows the prior art thin film head of FIG. 1 relative to a surface of a magnetic medium.

Following the lapping process in which pole tips 24 and 26 are lapped inward, the pole tip region resembles FIG. 3a. FIG. 3a shows the magnetic flux diagram for prior art thin film magnetic head 10 shown in FIG. 1. At the outer edges of upper pole tip 24 and lower pole tip 26, the direction of the magnetic flux reverses, as shown by the arrows, from the direction of the magnetic flux near the center of the fringe field. This flux reversal is due to the magnetic discontinuity at the outer boundaries of pole tips 24 and 26. FIG. 3b is a cross sectional view which shows the air bearing surface of the pole tips. FIG. 4 shows pole tips 24 and 26 of prior art thin film magnetic head 10 relative to a magnetic storage medium 32. Magnetic storage medium 32 moves in the direction indicated by the arrow in FIG. 4 relative to the pole tips of the prior art thin film head. Prior art thin film head 10 "flies" over the surface of magnetic medium 32 so that information can be written to and read from the surface of medium 32.

Figure 5:
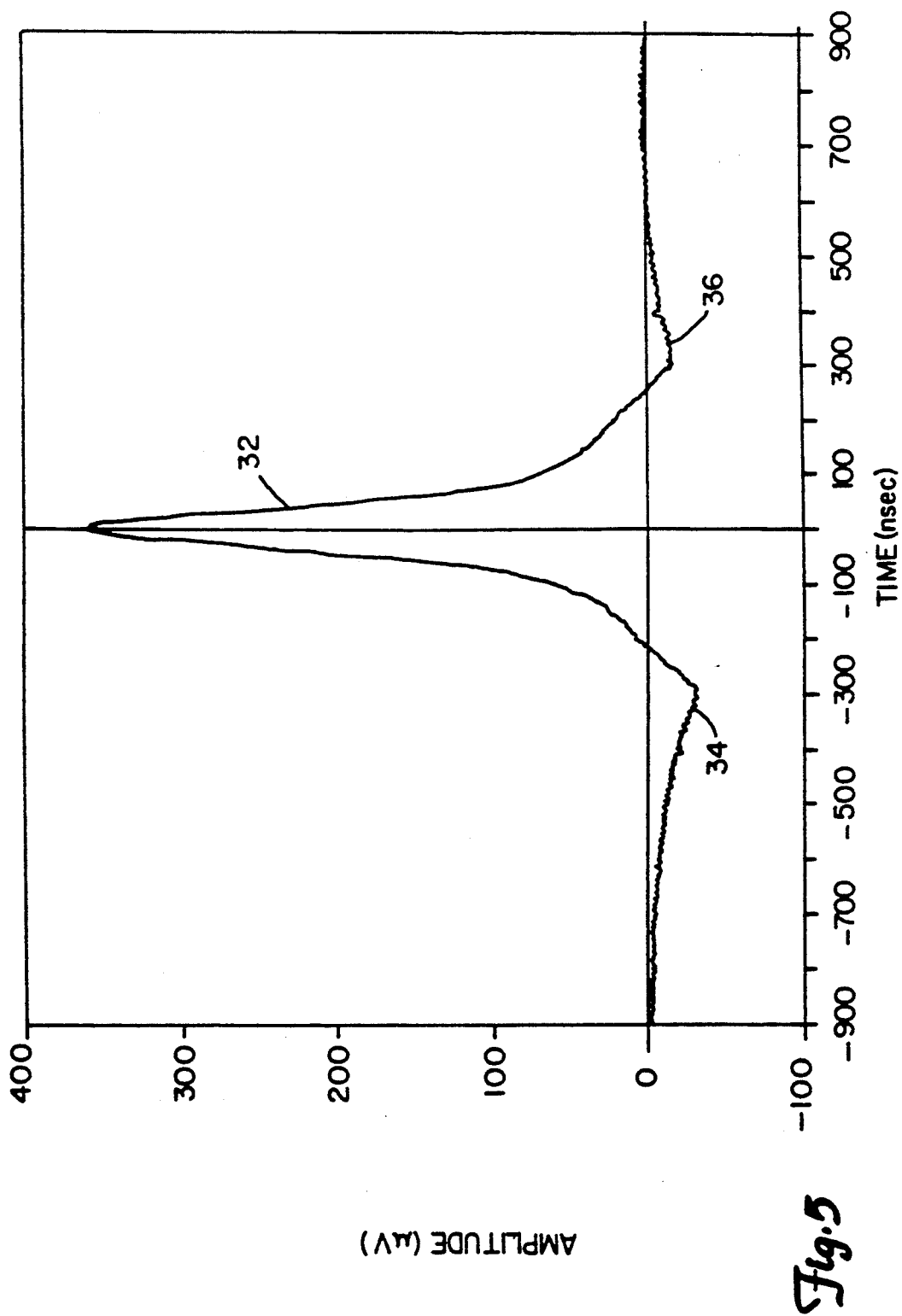
FIG. 5 shows an isolated readback pulse of the prior art thin film head shown in FIG. 4.

FIG. 5 shows a typical isolated readback pulse produced by a prior art thin film magnetic head such as that shown in FIG. 4. The signal is composed of the gap response 32, a leading discontinuity response (undershoot) 34 and a trailing discontinuity response (undershoot) 36. Undershoots 34 and 36 produced in a prior art thin film magnetic head cause adverse inter-symbol interference at high recording densities.

Figure 6:
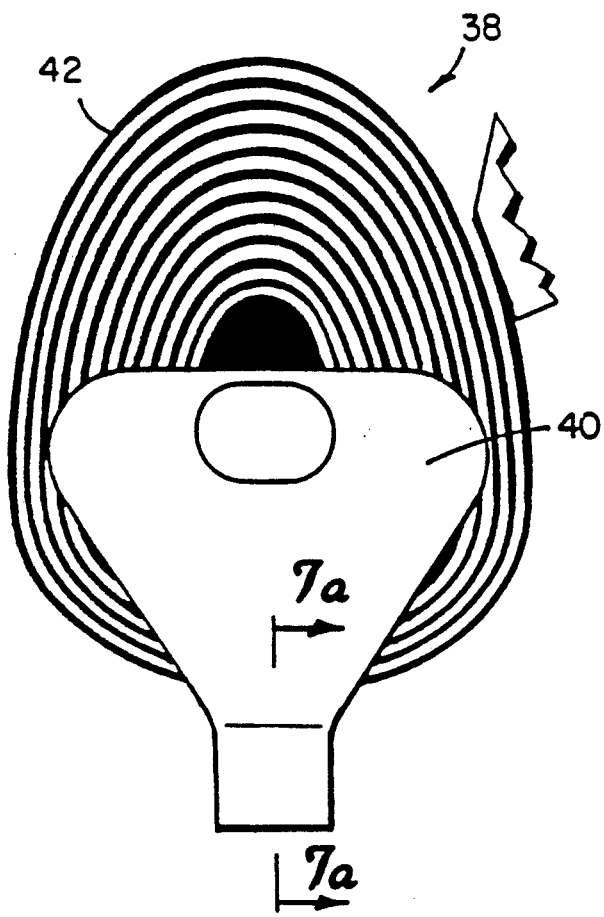
FIG. 6 shows a thin film magnetic head in accordance with the present invention.
Figure 7A:
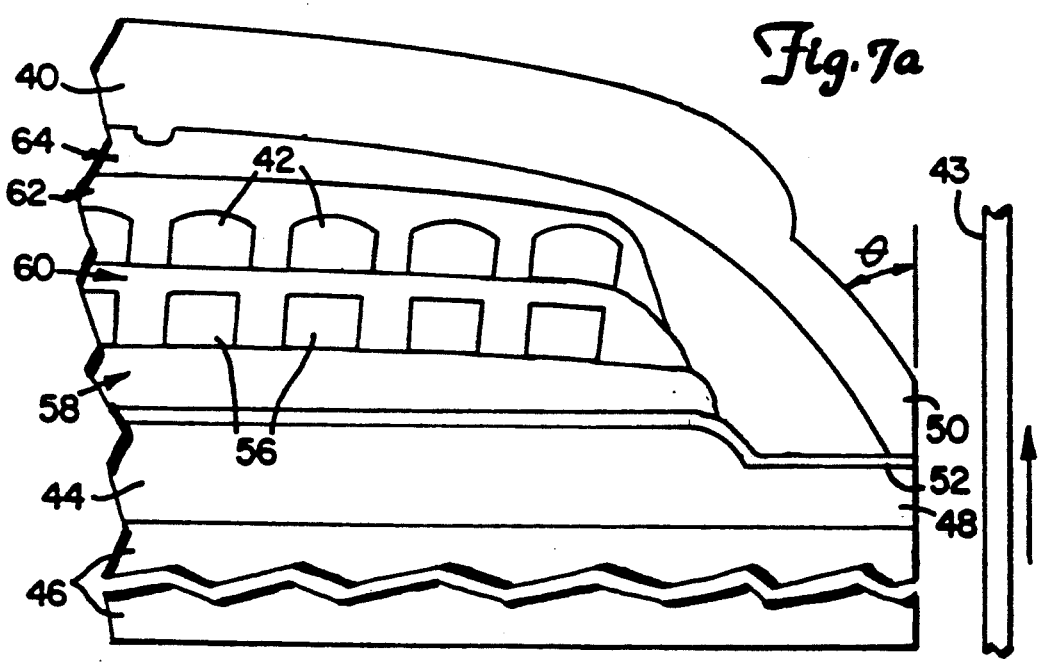
FIG. 7a is a cross sectional view of a portion of the thin film magnetic head of FIG. 6 taken along the line labeled 7a—7a relative to a surface of a magnetic medium.

FIGS. 6 and 7a show a thin film magnetic head 38 in accordance with the present invention, which reduces leading and trailing undershoots in the isolated readback pulse. Thin film head 38 includes top pole piece 40, coils 42 and 56, lower pole piece 44, magnetic substrate 46, lower pole tip 48, upper pole tip 50, gap layer 52, and insulation layers 58, 60, 62 and 64.

FIG. 7a is a cross sectional view of a portion of thin film head 38 shown in FIG. 6 taken along the line labeled 7a-7a "flying" over a surface of a magnetic medium 43. Magnetic medium 43 moves relative to head 38 in the direction indicated by the arrow. Thin film magnetic head 38 includes lower pole piece 44 deposited upon a magnetic substrate 46. In a preferred embodiment of the present invention, magnetic substrate 46 comprises, but is not limited to, a ferrite material. Lower pole piece 44 includes lower pole tip 48. Upper pole piece 40 includes upper pole tip 50. Lower pole tip 48 and upper pole tip 50 are separated by a gap layer 52. Typically, all pole pieces are nickel iron and gap layer 52 is $Al_2O_3$. Coils 42 and 56 extend between upper pole piece 40 and either lower pole piece 44, or magnetic substrate 46 as shown in FIG. 7b.

Thin film magnetic head 38 shown in FIG. 7a has two important distinctions over prior art thin film magnetic head 10 shown in FIG. 2. Thin film magnetic head 38 is deposited upon a magnetic substrate 46 and upper pole piece 40 has a gentler slope away from the recording surface at the upper pole tip 50 in comparison to the prior art thin film head.

FIG. 7a shows a take-off angle 8 which is measured between the plane defined by the face of the pole tips and the outer surface of upper pole tip 50. Angle $\theta$ is defined by insulation layers 58, 60, 62 and 64. Insulation layer 58 separates conductors 56 from lower pole piece 44 or magnetic substrate 46. Insulation layer 60 covers conductors 56 and supports conductors 42. Insulation layer 62 covers conductors 42. Layers 58, 60 and 62 are stacked and provide a stepped or tiered incline. Insulation layer 64 is applied over layers 58, 60, and 62 and provides a smooth base for forming the take-off angle $\theta$ with upper pole tip 50.

Insulation layers 58, 60, 62 and 64 preferably comprise, but are not limited to photoresist and are defined by a photolithographic process. Angle $\theta$ is dependent upon the geometry of layers 58, 60, 62 and 64. This geometry can be altered during the photolithographic deposition process to achieve the desired take-off angle $\theta$. In a preferred embodiment of the present invention, take-off angle $\theta$ is between substantially greater than 0° and about 60°.

FIG. 7b shows another embodiment of the present invention in which only the lower pole tip 49 remains upon the magnetic substrate 46.

Figure 8A:
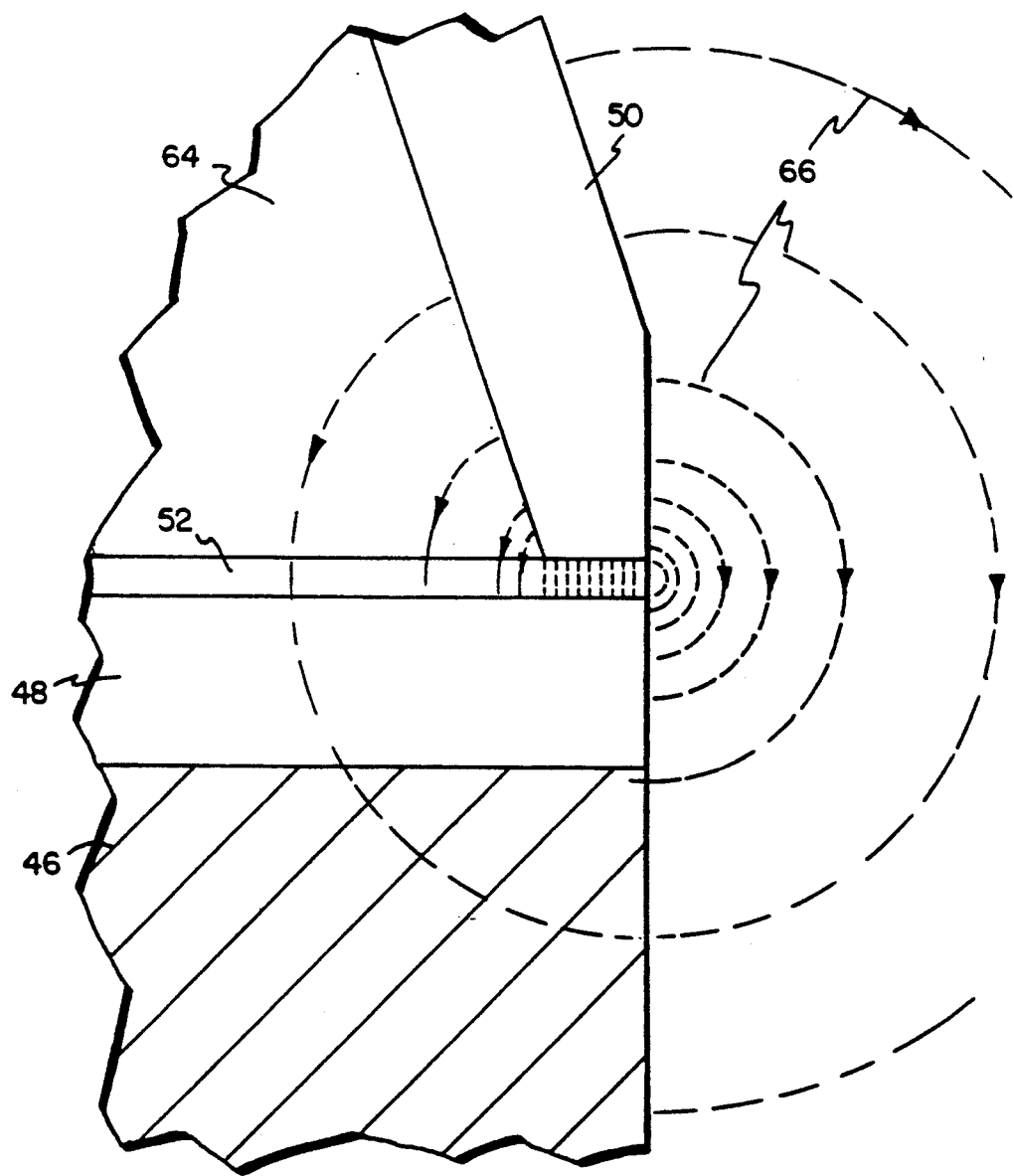
FIG. 8a shows a magnetic flux diagram for the thin film head of the present invention.

FIG. 8a is a magnetic flux diagram for the thin film magnetic head 38 shown in FIGS. 6 and 7a (and 7b). FIG. 8a shows upper pole tip 50 and lower pole tip 48 separated by gap layer 52. FIG. 8a shows magnetic flux lines 66 extending between top pole tip 50 and lower pole tip 48. When the magnetic flux pattern shown in FIG. 8a of thin film head 38 made in accordance with the present invention is compared with the prior art flux pattern shown in FIG. 3a, it is apparent that the flux reversal due to magnetic discontinuities is eliminated for the lower pole tip 48 in FIG. 8a and significantly reduced for the upper pole tip 50 in comparison to the prior art design shown in FIG. 3a. By limiting the flux reversal in the magnetic flux pattern, the present invention greatly reduces the undershoots in the isolated pulse signal associated with prior art thin film heads.

FIG. 8b shows a cross sectional view of the air bearing surface of the pole tips of FIG. 8a.

The use of magnetic substrate 46 and take-off angle θ combine to reduce significantly leading and trailing undershoots in the isolated pulse signal produced with thin film magnetic head 38. Because thin film head 38 is deposited upon magnetic substrate 46, lower pole tip 48 (or 49) is important because it confines the side fringing field to better define the track width during reading and writing, in comparison to allowing the semi-infinite substrate 46 to serve as a gap edge, as shown in FIG. 8c.

Figure 9:
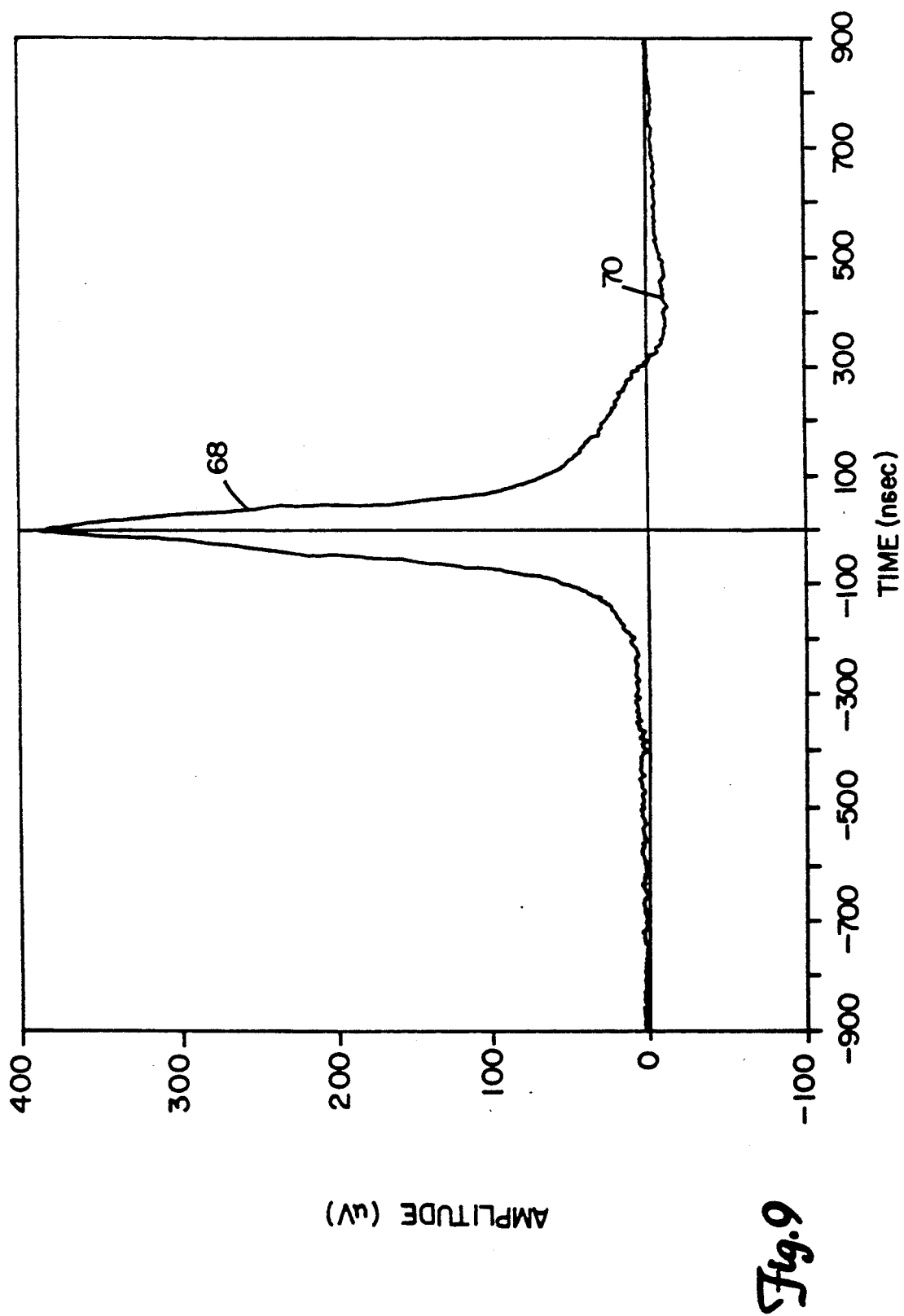
FIG. 9 shows the isolated readback pulse produced by a thin film head made in accordance with the present invention.

FIG. 9 shows an isolated pulse signal output during a read operation taken from a thin film magnetic head made in accordance with the present invention. FIG. 9 is a graph of time verses amplitude for the isolated pulse signal. FIG. 9 shows a gap response 68 and a small trailing undershoot 70. There is no leading undershoot apparent in FIG. 9. Furthermore, the trailing undershoot 70 shown in FIG. 9 is reduced compared to the trailing undershoot 36 shown in FIG. 5 for a prior art thin film head. Undershoot 70 in FIG. 9 can be reduced even further by making take-off angle θ shown in FIG. 7 smaller.

The present invention offers significant advantages over prior art thin film magnetic heads. The present invention uses a combination of a magnetic substrate and a reduced top pole take-off angle to reduce undershoots in the isolated readback pulse. By reducing the undershoots, the present invention allows for higher data densities over prior art thin film head designs using common detection circuitry because the inter-symbol interference caused by complicated super-position of readback pulses is reduced.

Although the present invention has been described with reference to preferred embodiments, workers skilled in the art will recognize that changes may be made in form and detail without departing from the spirit and scope of the invention.

What is claimed is:

1. A method of fabricating a thin film magnetic transducer comprising:
   obtaining a magnetic substrate;
   forming a bottom pole piece upon the magnetic substrate having a bottom pole tip;
   forming a gap layer on the bottom pole piece;
   forming an insulating layer on most of the gap layer over the bottom pole piece;
   forming a top pole piece over the bottom pole piece having a top pole tip, wherein only the gap layer separates the bottom pole tip from the top pole tip and said gap layer is sandwiched between the top pole tip and the bottom pole tip, and the insulating layer separates a portion of the top pole piece from a portion of the bottom pole piece, the top therefore with bottom pole pieces defining a high permeability magnetic flux path and a magnetic flux gap between the top pole tip and the bottom pole tip, the magnetic flux gap being defined by the top and bottom pole tips and the gap layer whereby the magnetic flux gap if formed only across the gap layer; and
   forming a plurality of conductors between the top pole piece and the bottom pole piece which are embedded in the insulating layer whereby the conductors are separated from the bottom pole piece and the top pole piece by the insulating layer and completely surrounded by the insulating layer.

2. The method of claim 1 wherein the magnetic substrate comprises a ferrite material.

3. The method of claim 1 including forming a surface of the magnetic substrate which defines a substrate plane, the top pole tip includes a top pole tip face and the bottom pole tip includes a bottom pole tip face, top and bottom pole tip faces defining a transducing plane generally perpendicular to the substrate plane for reading and writing information on a magnetic medium, wherein the top pole has a top pole take-off angle between the transducing plane and an outer surface of the top pole which is inclined; the top pole take-off angle being substantially greater than 0° and less than about 60°.

4. A method of fabricating thin film magnetic transducer comprising:
   forming a bottom pole piece upon a substrate and having a bottom pole tip;
   forming a gap layer on the bottom pole piece;
   forming a top pole piece over the bottom pole piece and having a top pole tip, wherein only the gap layer separates the bottom pole tip from the top pole tip and said gap layer is sandwiched between the top pole tip and the bottom pole tip, the top and bottom pole pieces defining a high permeability magnetic flux path with a magnetic flux gap between the top pole tip and the bottom pole tip, the magnetic flux gap being defined by the top and bottom pole tips and the gap layer whereby the magnetic flux gap is formed only across the magnetic flux gap layer;
   forming an insulating layer between the bottom pole piece and the top pole piece wherein the insulating layer separates a portion of the top pole piece from a portion of the bottom pole piece;
   forming a plurality of first conductors between the top pole piece and the bottom pole piece which are embedded in the insulating layer and form a conductive coil, whereby the plurality of first conductors are separated from the bottom pole piece and the top pole piece by the insulating layer and completely surrounded by the insulating layer;
   forming a plurality of second conductors between the top pole piece and the bottom pole piece which are embedded in the insulating layer and form a conductive coil, whereby the plurality of second conductors are separated from the bottom pole piece and the top pole piece by the insulating layer and completely surrounded by the insulating layer; and
   wherein forming the insulating layer comprises:
      forming a first layer on most of the gap layer over the bottom pole piece, wherein the plurality of first conductors are carried on the first layer;

forming a second layer on the first layer, wherein the plurality of first conductors extend through the second layer and the plurality of second conductors are carried on the second layer, the second layer forming a first tier with the first layer;

forming a third layer on the second layer, wherein the plurality of second conductors extend through the third layer, the third layer forming a second tier with the second layer; and forming a fourth layer on the third layer adjacent the top pole piece and on the first and second tiers, wherein a portion of the fourth layer defines a top pole take-off angle based upon the first and second tiers.

5. The method of claim 4 wherein the substrate comprises a magnetic substrate.

6. The method of claim 5 wherein the magnetic substrate comprises a ferrite material.

7. A method of fabricating thin film magnetic transducer comprising:

obtaining a magnetic substrate;

forming a bottom pole tip over only part of the magnetic substrate;

forming a top pole piece over the magnetic substrate and having a top pole tip, the top pole piece, bottom pole tip, and the magnetic substrate defining a high permeability magnetic flux path with a magnetic flux gap between the top pole tip and the bottom pole tip, the magnetic flux gap being defined between the top and bottom pole tips;

forming an insulating layer between the magnetic substrate and the top pole piece wherein the insulating layer separates a portion of the top pole piece from a portion of the magnetic substrate and defines the magnetic flux gap between the top pole tip and the bottom pole tip; and forming a plurality of conductors between the top pole piece and the magnetic substrate which are embedded in the insulating layer, whereby the plurality of conductors are separated from the magnetic substrate and the top pole piece by the insulating layer and completely surrounded by the insulating layer.

8. The method of claim 7 wherein the magnetic substrate comprises a ferrite material.

9. The thin film magnetic transducer of claim 7 including forming a surface of the magnetic substrate which defines a substrate plane, the top pole tip includes a top pole tip face and the bottom pole tip includes a bottom pole tip face, top and bottom pole tip faces defining a transducing plane generally perpendicular to the substrate plane for reading and writing information on a magnetic medium, wherein the top pole has a top pole take-off angle between the transducing plane and an outer surface of the top pole which is inclined; the top pole take-off angle being substantially greater than 0° and less than about 60°.

10. A method of fabricating thin film magnetic transducer comprising:

obtaining a magnetic substrate;

forming a bottom pole tip deposited upon the substrate;

forming a top pole piece over the substrate having a top pole tip, the top pole piece, bottom pole tip and the substrate defining a high permeability magnetic flux path with a magnetic flux gap between the top pole tip and the bottom pole tip;

forming an insulating layer between the substrate and the top pole piece wherein the insulating layer separates a portion of the top pole piece from a portion of the substrate and defines the magnetic flux gap between the top pole tip and the bottom pole tip;

forming a plurality of first conductors between the top pole piece and the substrate which are embedded in the insulating layer and form a conductive coil, whereby the plurality of first conductors are separated from the bottom pole piece and the top pole piece by the insulating layer and completely surrounded by the insulating layer;

forming a plurality of second conductors between the top pole piece and the substrate which are embedded in the insulating layer and form a conductive coil, whereby the plurality of second conductors are separated from the bottom pole piece and the top pole piece by the insulating layer and completely surrounded by the insulating layer; and wherein forming the insulating layer comprises;

forming a first layer adjacent the substrate, wherein the plurality of first conductors are carried on the first layer;

forming a second layer on the first layer, wherein the plurality of first conductors extend through the second layer and the plurality of second conductors are carried on the second layer, the second layer forming a first tier with the first layer;

forming a third layer on the second layer, wherein the plurality of second conductors extend through the third layer, the third layer forming a second tier with the second layer; and forming a fourth layer on the third layer adjacent the top pole tip upon the first and second tiers, wherein a portion of the fourth layer defines the magnetic flux gap between the bottom pole tip and the top pole tip and a portion of the fourth layer defines a top pole take-off angle based upon the first and second tiers.

11. The method of claim 10 wherein the magnetic substrate comprises a ferrite material.

* * * * *

UNITED STATES PATENT AND TRADEMARK OFFICE
CERTIFICATE OF CORRECTION

PATENT NO. : 5,184,394

DATED : February 9, 1993

INVENTOR(S) : WEI C. HSIE, TIMOTHY A. MASADEN, NATHAN CURLAND

It is certified that error appears in the above-identified patent and that said Letters Patent is hereby corrected as shown below:

Col. 6, line 8, delete "if", insert --is--

Signed and Sealed this

Ninth Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,184,394
DATED : February 9, 1993
INVENTOR(S) : WEI C. HSIE, TIMOTHY A. MADSEN, NATHAN CURLAND It is certified that error appears in the above-identified patent and that said Letters Patent is hereby corrected as shown below:

On the title page: Item

Delete [75] Inventors: Wei C. Hsie, Eden Prairie; Timothy A. Masaden, Bloomington; Nathan Curland, St. Louis Park, all of Minn.

Insert [75] Inventors: Wei C. Hsie, Eden Prairie; Timothy A. Madsen, Bloomington; Nathan Curland, St. Louis Park, all of Minn.

Signed and Sealed this

Twenty-eighth Day of December, 1993

Attest:

BRUCE LEHMAN

*Attesting Officer*   *Commissioner of Patents and Trademarks*